(12) United States Patent
Terada et al.

(10) Patent No.: US 8,662,253 B2
(45) Date of Patent: Mar. 4, 2014

(54) LUBRICATING OIL FEEDING STRUCTURE

(75) Inventors: Koji Terada, Saitama (JP); Hiroshi Yokota, Saitama (JP); Kenichi Nakano, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 466 days.

(21) Appl. No.: 12/883,809

(22) Filed: Sep. 16, 2010

(65) Prior Publication Data

US 2011/0061492 A1  Mar. 17, 2011

(30) Foreign Application Priority Data

Sep. 16, 2009  (JP) .................................. 2009-215040

(51) Int. Cl.
*F16H 57/02* (2012.01)
(52) U.S. Cl.
USPC .......................................................... 184/6.5
(58) Field of Classification Search
USPC .............. 184/6.5, 7.2, 7.3, 7.4, 6.12, 8, 104.2
See application file for complete search history.

(56) References Cited

U.S. PATENT DOCUMENTS

| | | | |
|---|---|---|---|
| 4,474,483 A * | 10/1984 | Suzuki et al. .................. 384/114 |
| 5,195,400 A * | 3/1993 | Hayakawa et al. .......... 74/606 R |
| 5,480,234 A * | 1/1996 | Chen et al. ..................... 384/313 |
| 6,810,771 B1 * | 11/2004 | Jackson ........................ 74/606 R |
| 7,252,615 B2 * | 8/2007 | Kempf ............................ 475/159 |
| 7,261,183 B2 * | 8/2007 | Miller ........................... 184/6.12 |
| 7,850,566 B2 * | 12/2010 | Kim ................................ 475/159 |
| 7,861,827 B2 * | 1/2011 | Madge et al. ................. 184/6.12 |
| 8,033,941 B2 * | 10/2011 | Nishida et al. ................. 475/160 |
| 8,267,826 B2 * | 9/2012 | Duong et al. .................. 475/159 |
| 2004/0261748 A1 * | 12/2004 | Lafleur ....................... 123/196 R |
| 2008/0245614 A1 * | 10/2008 | Matucheski ................. 184/6.12 |
| 2009/0114480 A1 * | 5/2009 | Madge et al. ................. 184/6.12 |
| 2012/0247875 A1 * | 10/2012 | Suzuta et al. ................. 184/6.12 |

FOREIGN PATENT DOCUMENTS

JP  2006-077650 A  3/2006

* cited by examiner

*Primary Examiner* — William E Dondero
*Assistant Examiner* — Mark K Buse
(74) *Attorney, Agent, or Firm* — Birch, Stewart, Kolasch & Birch, LLP (57) ABSTRACT

A lubricating oil feeding structure that permits an adequate amount of lubricating oil to be fed to those parts around the transmission while avoiding an excess supply of lubricating oil to the lubricating oil passage in the shaft of the transmission. The transmission has a space (as a recess to hold the shaft therein) in which is arranged the oil guide part. The oil guide part has the bottomed cylinder, with its one end opened, the flange that flares outward at the open end of the bottomed cylinder, and the oil holes that communicate between the inside and the outside of the bottomed cylinder. The oil guide part is arranged in the space in such a way that the flange comes into contact with the outer race of the bearing.

14 Claims, 5 Drawing Sheets

LUBRICATING OIL FEEDING STRUCTURE

CROSS-REFERENCE TO RELATED APPLICATIONS

The present application claims priority under 35 USC 119 to Japanese Patent Application No. 2009-215040 filed on Sep. 16, 2009 the entire contents of which are hereby incorporated by reference.

BACKGROUND OF THE INVENTION

1. Field of the Invention

The present invention relates to a structure to feed lubricating oil to the transmission shaft for the internal combustion engine of motorcycles and the like.

2. Description of Background Art

The transmission shaft connected to the internal combustion engine of motorcycles is equipped with some sort of lubricating oil feeding structure. A known example of them includes a main shaft functioning as the transmission shaft rotatably supported on the crankcase, a main lubricating oil passage that passes through the center of the main shaft, and multiple branch passages which radially branch off from the main passage, so that lubricating oil is supplied to the internal circumference of the gears mounted on the main shaft and the bearings to support the main shaft. See, for example, Japanese Patent Laid-Open No. 2006-77650.

The lubricating oil feeding structure disclosed in Japanese Patent Laid-Open No. 2006-77650 mentioned above has the following disadvantages. The bearings supporting the ends of the main shaft are widely open outward in both directions and this opening permits lubricating oil to flow in more than necessary for the bearings. This makes it necessary to supply the main lubricating oil passage in the main shaft with a large amount of lubricating oil for lubrication of various parts.

SUMMARY AND OBJECTS OF THE INVENTION

The present invention was completed in view of the foregoing. It is an object of an embodiment of the present invention to provide a lubricating oil feeding structure which is capable of easily controlling the amount of lubricating oil to be fed to the parts around the transmission shaft while avoiding an excess supply of lubricating oil to the lubricating oil passage in the transmission shaft.

According to an embodiment of the present invention, to address the above-mentioned problem covers a lubricating oil feeding structure designed to feed lubricating oil to a lubricating oil passage and a bearing through a bearing accommodating recess part which is formed in a casing outside the bearing that supports the shaft end of the transmission shaft and which is positioned outside the bearing at the shaft end and communicates with a lubricating oil supply source, the lubricating oil feeding structure being arranged in the shaft accommodating recess part in such a way that it faces the bearing and the lubricating oil passage extending in the shaft from the shaft end of the transmission shaft, wherein the shaft accommodating recess part holds therein an oil guide part which is composed of a bottomed cylinder, with one end thereof opened, a flange that flares outward from the opening of the bottomed cylinder, and oil holes communicating between the inside and the outside of the bottomed cylinder, and which is arranged in the shaft accommodating recess part in such a way that the flange comes into contact with the outer race of the bearing.

The foregoing structure is characterized in that the shaft accommodating recess part holds therein an oil guide part which is composed of a bottomed cylinder, with one end thereof opened, a flange that flares outward from the opening of the bottomed cylinder, and oil holes communicating between the inside and the outside of the bottomed cylinder, and which is arranged in the shaft accommodating recess part in such a way that the flange comes into contact with the outer race of the bearing. This structure permits an adequate amount of lubricating oil to be fed to those parts around the transmission while avoiding excess supply of lubricating oil to the lubricating oil passage in the shaft of the transmission.

The foregoing structure may be further characterized in that the bottomed cylinder of the oil guide part orients such that the end surface opposite to the flange comes into contact with the casing and the end surface has a circular recess formed therein, the circular recess holding an O-ring fitted thereinto. Despite its simple configuration, this structure absorbs dimensional errors of parts when the oil guide part is mounted.

The foregoing structure may be further characterized in that the circular recess has multiple narrowing parts formed therein to retain the O-ring. This structure prevents the O-ring from slipping off and facilitates assembling.

The foregoing structure may be further characterized in that the oil guide part has a flat wall as a detent which projects from the peripheral side thereof, the flat wall fitting into a groove which is formed in the casing and communicates with the lubricating oil supply source. This structure permits the groove to function as both the detent to fix the oil guide part and the lubricating oil passage and hence saves the manufacturing steps.

The foregoing structure may be further characterized in that the shaft end of the transmission shaft extends into the bottomed cylinder of the oil guide part. This structure permits an adequate clearance to exist between the extended part of the shaft end and the inside of the oil guide part, thereby ensuring the feeding of lubricating oil to the bearing. Also, the outer periphery of the flange of the oil guide part is faucet joint into the coupling case, so that an adequate clearance is ensured between the extended part of the shaft end and the inner periphery of the oil guide part.

The structure according to the present invention is characterized in that the shaft accommodating recess part holds therein an oil guide part which is composed of a bottomed cylinder, with one end thereof opened, a flange that flares outward from the opening of the bottomed cylinder, and oil holes communicating between the inside and the outside of the bottomed cylinder, and which is arranged in the shaft accommodating recess part in such a way that the flange comes into contact with the outer race of the bearing. This structure permits an adequate amount of lubricating oil to be fed to those parts around the transmission while avoiding excess supply of lubricating oil to the lubricating oil passage in the shaft of the transmission.

Also, the bottomed cylinder of the oil guide part orients such that the end surface opposite to the flange comes into contact with the casing and the end surface has a circular recess formed therein, the circular recess holding an O-ring fitted thereinto, so that this structure absorbs dimensional errors of parts when the oil guide part is mounted, despite its simple configuration.

Also, the circular recess has multiple narrowing parts formed therein to retain the O-ring, so that this structure prevents the O-ring from slipping off and facilitates assembling.

Also, the oil guide part has a flat wall as a detent which projects from the peripheral side thereof, the flat wall fitting into a groove which is formed in the casing and communicates with the lubricating oil supply source so that this structure permits the groove to function as both the detent to fix the oil guide part and the lubricating oil passage and hence saves manufacturing steps.

Also, the shaft end of the transmission shaft extends into the bottomed cylinder of the oil guide part, so that this structure permits an adequate clearance to exist between the extended part of the shaft end and the inside of the oil guide part, thereby ensuring the feeding of lubricating oil to the bearing. Also, the outer periphery of the flange of the oil guide part is faucet-fitted into the coupling case, so that an adequate clearance is ensured between the extended part of the shaft end and the inner periphery of the oil guide part.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

One embodiment of the present invention will be described below with reference to the accompanying drawings.

Figure 1:
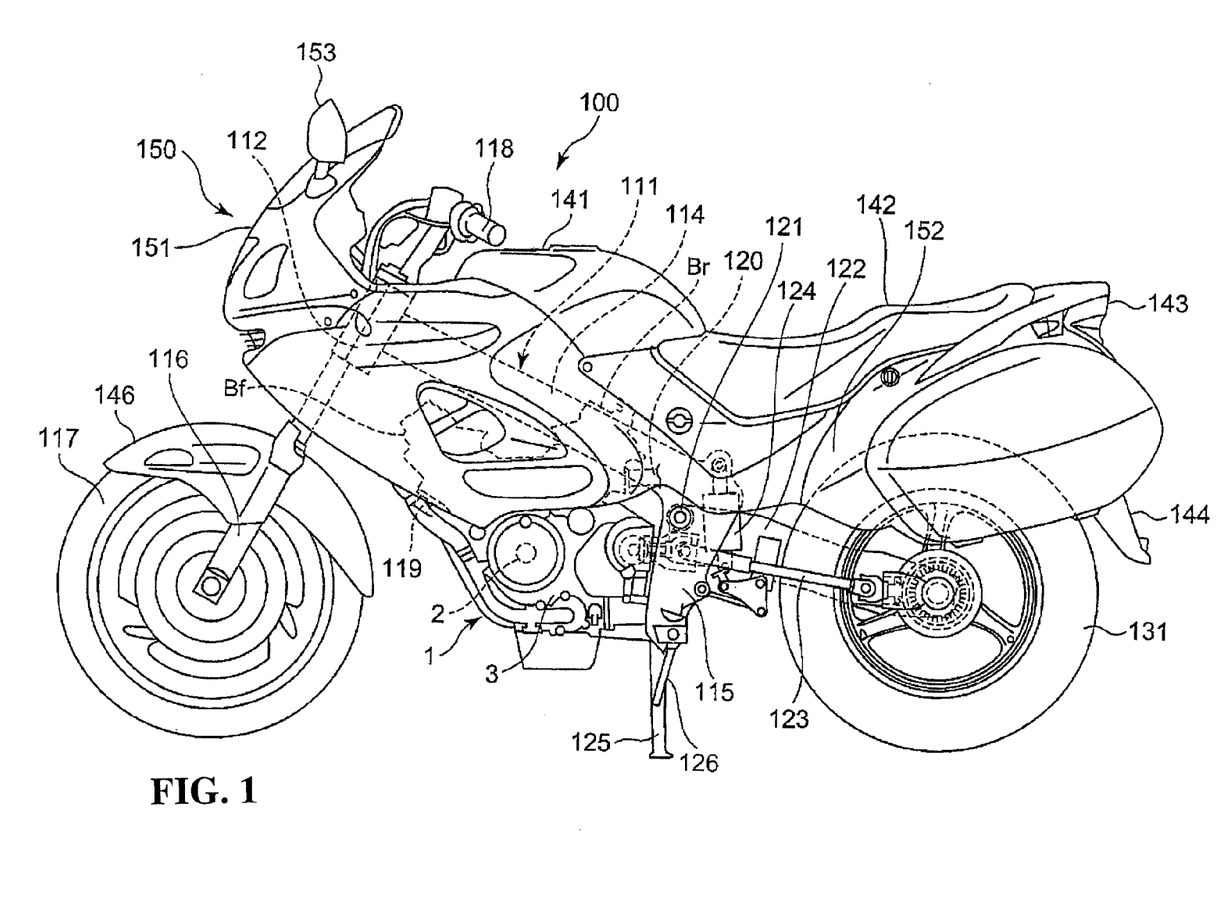
FIG. 1 is a side view showing a motorcycle provided with the internal combustion engine pertaining to the embodiment of the present invention.

FIG. 1 is a side view showing the motorcycle which is provided with the internal combustion engine pertaining to the embodiment of the present invention. In addition, in the following description, directions, such as front and rear, right and left, and up and down, are determined with respect to the body of the motorcycle.

A motorcycle 100 has a body frame 111, which is composed of a head pipe 112 positioned at the front part of the body, paired right and left main frames 114 extending rearward from the head pipe 112 to the center of the body, paired right and left pivot plates 115 extending downward from the main frames 114, and the rear frames (not shown) extending from the rear end of the main frame 114 to the rear part of the body.

The head pipe 112 rotatably supports a front fork 116. The front fork 116 rotatably supports a front wheel 117 at the lower end thereof. The head pipe 112 also supports a steering handle 118 at the upper part thereof.

Under the main frame 114 is arranged a four-cylinder internal combustion engine 1 of front-to-rear V-type (power unit). This internal combustion engine 1 is of transverse type, with a crankshaft 2 orienting horizontally to the right and left. The internal combustion engine may be a water-cooled one of the OHC type. It has a crankcase 3 to which are attached a front bank (cylinder) Bf and a rear bank (cylinder) Br, each bank including two cylinders and inclining forward and rearward. The two banks form an angle smaller than 90 degrees.

To the exhaust port of the front bank Bf is connected one end of an exhaust pipe 119 (one each at the right and left). The exhaust pipe 119 extends from the exhaust port downward and then rearward until it joins an exhaust pipe 120 (one each at the right and left) extending from the exhaust port of the rear bank Br. The four exhaust pipes are gathered into a single exhaust pipe (not shown) connected to the muffler (not shown) arranged behind the internal combustion engine 1.

Behind the internal combustion engine 1 is a pivot axis 121, to which is attached a rear fork 122 in such a way that the rear fork 122 swings up and down around the pivot axis 121. At the rear end of the rear fork 122 is rotatably supported a rear wheel 131. The rear wheel 131 and the internal combustion engine 1 are connected to each other through a drive shaft 123 placed in the rear fork 122, so that the driving force is transmitted from the internal combustion engine 1 to the rear wheel 131 through the drive shaft 123. Between the rear fork 122 and the body frame 111 is a rear shock absorber 124 which absorbs shocks from the rear fork 122.

Behind the internal combustion engine 1 is a stand 125 to support the body. Also, under the left side of the internal combustion engine 1 is a side stand 126.

Above the main frame 114 is a fuel tank 141 which covers the top of the internal combustion engine 1. Behind the fuel tank 141 is a seat 142, which is supported on the rear frame mentioned above. Behind the seat 142 is arranged a tail lamp 143, and under the tail lamp 143 is arranged a rear fender 144 that covers the rear wheel 131.

The motorcycle 100 also has a body cover 150 of plastics which covers the body. The body cover 150 includes a front cover 151, which continuously covers the front part of the body frame 111 to the front part of the internal combustion engine 1, and a rear cover 152, which covers the lower part of the seat 142. To the top of the front cover 151 are attached right and left paired mirrors 153. To the front fork 116 is attached a front fender 146, which covers the upper part of the front wheel 117.

Figure 2:
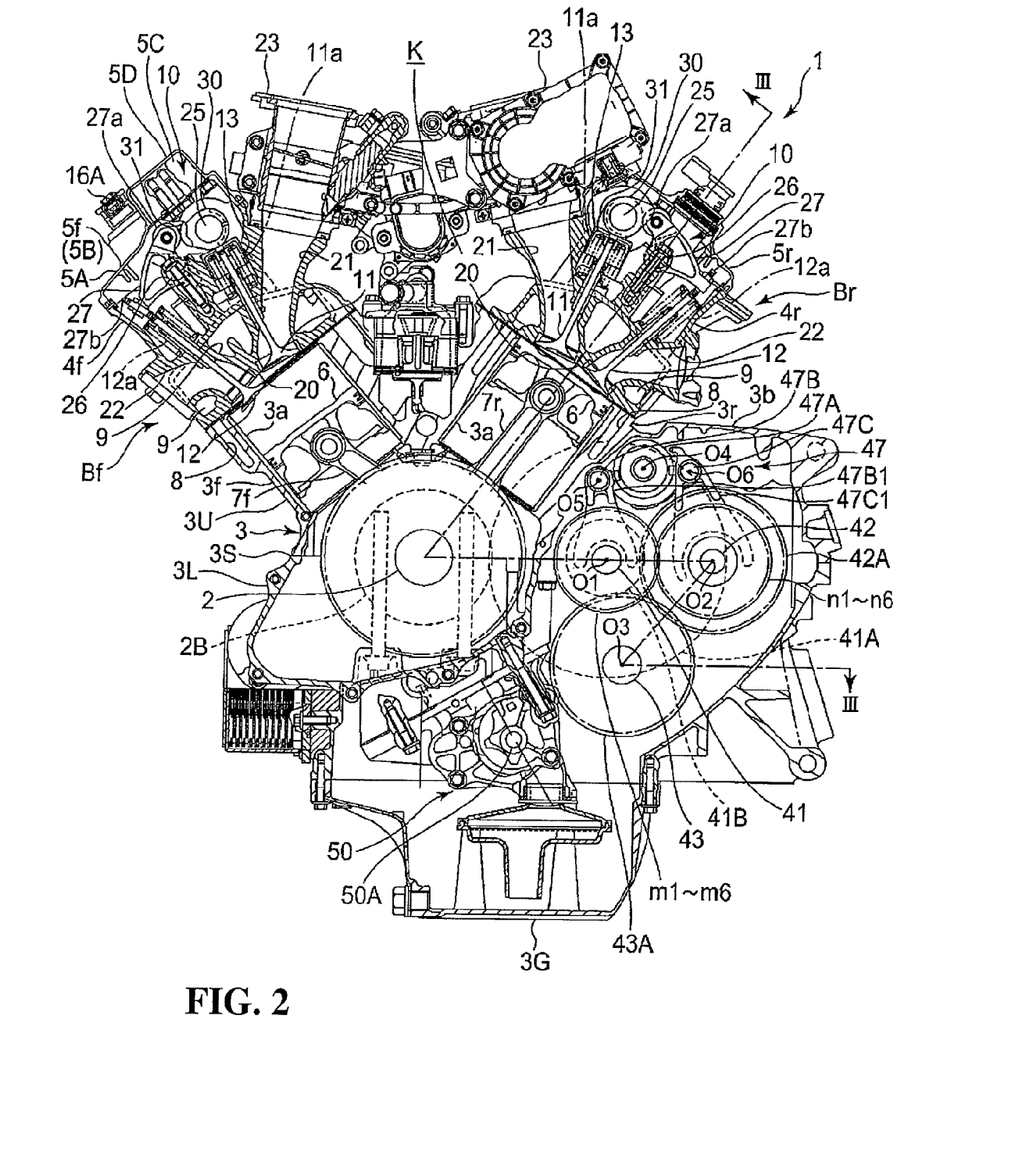
FIG. 2 is a sectional view showing the internal combustion engine.

FIG. 2 is a sectional view showing the internal combustion engine 1. In addition, the vertical direction of FIG. 2 coincides with the vertical direction of the internal combustion engine 1 and the left and right sides of FIG. 2 denote respectively the front and rear sides of the internal combustion engine 1.

Between the front bank Bf and the rear bank Br is formed a V-bank space K, which is a V-shaped space as viewed from the side.

The crankcase 3 includes an upper crankcase 3U and a lower crankcase 3L. The crankshaft 2 is pivotally supported between the upper crankcase 3U and the lower crankcase 3L. The upper crankcase 3U is provided with a front cylinder block 3f and a rear cylinder block 3r, which extend obliquely upward therefrom in a V shape (as viewed from the side). Each of the front and rear cylinder blocks 3f and 3r holds two cylinders therein.

To the lower part of the lower crankcase 3L is attached an oil pan 3G bulging downward, which stores engine oil for the internal combustion engine 1. An oil pump 50 to circulate the engine oil through the internal combustion engine 1 is positioned under the crankshaft 2 in the lower crankcase 3L.

To the front cylinder block 3f is attached a front cylinder head 4f, which is inclined forward and upward and tightened with bolts (not shown). The front cylinder head 4f is covered with a front cylinder head cover 5f. Likewise, to the rear cylinder block 3r is attached a rear cylinder head 4r, which is inclined backward and upward and tightened with bolts (not shown). The rear cylinder head 4r is covered with a rear cylinder head cover 5r.

Each of the front cylinder block 3f and the rear cylinder block 3r has a cylinder bore 3a therein, which permits a piston 6 to reciprocate therein. The pistons 6 are connected to the single crankshaft 2 (shared by them) through connecting rods 7f and 7r.

Each of the cylinder blocks 3f and 3r is provided with a water jacket 8 which permits cooling water to flow therethrough to cool the cylinder blocks 3f and 3r. The water jacket 8 is arranged so as to surround the cylinder bore 3a.

Each of the front cylinder head 4f and the rear cylinder head 4r is provided with a combustion chamber 20, an intake port 21, and an exhaust port 22 above the cylinder bore 3a. To each of the intake ports 21 is connected a throttle body 23 which adjusts the amount of air-fuel mixture flowing through each of the intake ports 21.

Each of the cylinder heads 4f and 4r is provided with a water jacket 9 for cooling water to flow therethrough to cool them. The water jacket 9 is arranged so as to surround the intake port 21 and the exhaust port 22.

Each of the cylinder head 4f and 4r is provided with paired intake valves 11 and paired exhaust valves 12. The intake valves 11 are capable of opening and closing but are energized so as to close the intake port 21 by a valve spring 11a. The exhaust valves 11 are capable of opening and closing but are energized so as to close the exhaust port 22 by a valve spring 12a.

The intake valve 11 and the exhaust valve 12 are opened and closed by a valve gear 10 (of unicam type) which is driven by a cam shaft 25 (one each for the cylinder heads 4f and 4r).

The valve gear 10 includes the cam shaft 25, a locker shaft 26, and a locker arm 27. The cam shaft 25 is pivotally mounted on each of the cylinder heads 4f and 4r above the intake valve 11. The locker shaft 26 is fixed to each of the cylinder heads 4f and 4r, with its axis being parallel to the cam shaft 25. The locker arm 27 is swingably supported on the locker shaft 26.

The cam shaft 25 has an intake cam 30 and an exhaust cam 31, both projecting toward the periphery of the cam shaft 25. The cam shaft 25 rotates in synchronism with the rotation of the crankshaft 2. The intake cam 30 and the exhaust cam 31 have a cam profile such that the distance (or radius) from the center to the periphery is not constant. As they rotate, their radius changes so that the intake valve 11 and the exhaust valve 12 move up and down.

Between the camshaft 25 and the intake valve 11 and under the camshaft 25 is arranged a valve lifter 13, which is slidably fitted into each of the cylinder heads 4f and 4r.

At one end of the locker arm 27, which is pivotally supported by the locker shaft 26, is a roller 27a in rolling contact with the exhaust cam 31. At the other end of the locker arm 27 is a tappet screw 27b, which is screwed in contact with the upper end of the exhaust valve 12 so as to adjust the position of movement.

As the camshaft 25, the intake cam 30, and the exhaust cam 31 turn altogether, the intake cam 30 pushes down the intake valve 11 through the valve lifter 13 and the exhaust cam 31 pushes down the exhaust valve 12 through the locker arm 27, so that the intake port 21 and the exhaust port 22 are opened and closed at a prescribed timing which is determined by the phase of rotation of the intake cam 30 and the exhaust cam 31.

Figure 3:
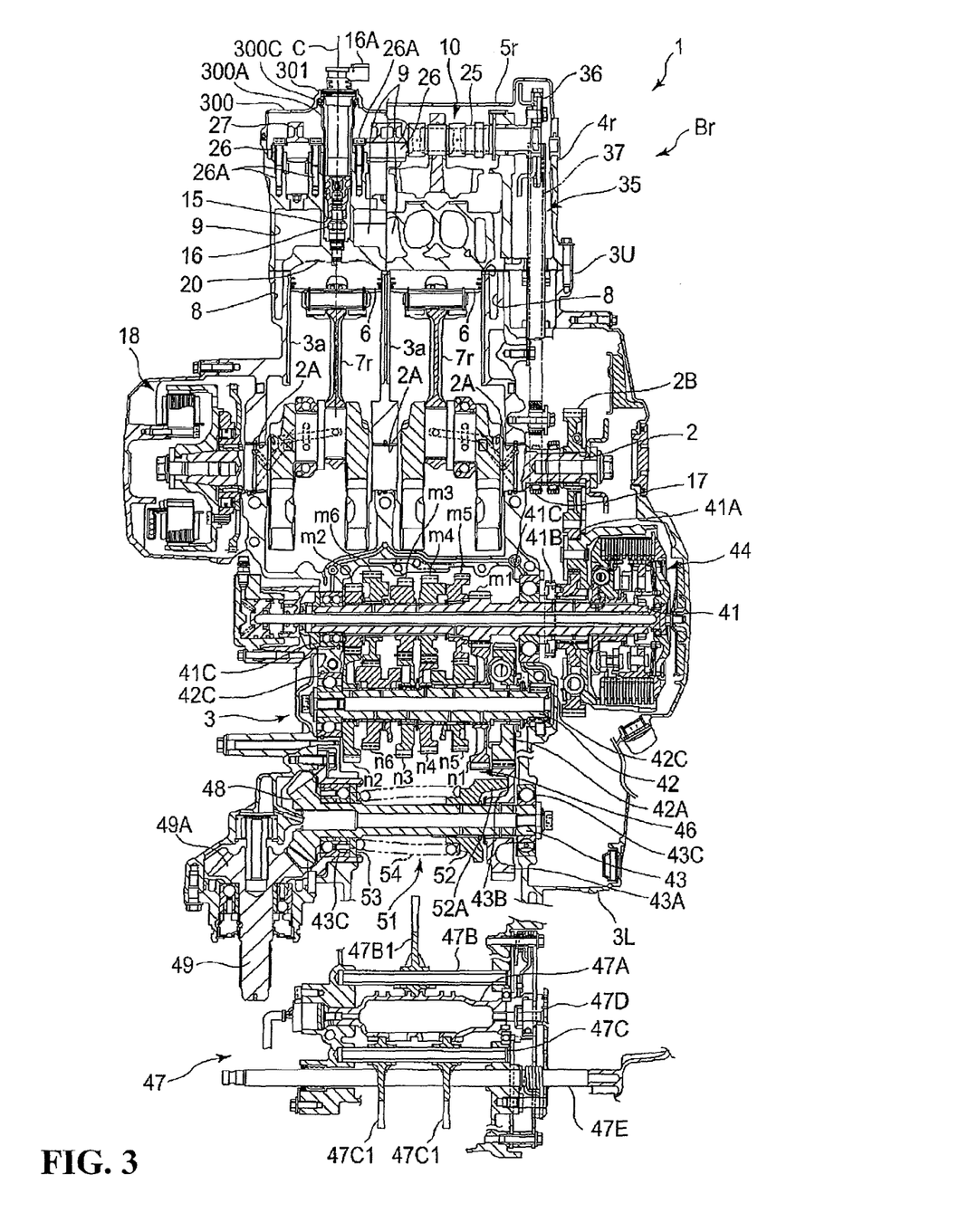
FIG. 3 is a sectional view taken along the line in FIG. 2.

FIG. 3 is a sectional view taken along the line in FIG. 2. This sectional view is that of the rear bank Br, but it is the same as that of the front bank Bf; therefore, the description of the front bank Bf is omitted in the following.

As shown in FIG. 3, each cylinder of the cylinder head 4r has a plug-inserting hole 15, which is formed along the cylinder axis line C or the central axis line of the cylinder bore 3a. In the plug-inserting hole 15 is arranged the spark plug 16, with its tip facing the combustion chamber 20. (The spark plug of the right cylinder is not shown.)

The crankshaft 2 is pivotally supported in the crankcase 3 by metal bearings 2A which are arranged at the intermediate part and both ends of the shaft. At one end of the crankshaft 2 is arranged a camshaft drive sprocket 17, which transmits the output of the crankshaft 2. At the side of the camshaft drive sprocket 17 of the internal combustion engine 1 is a cam chain room 35, which extends up and down in each of the banks Bf and Br. A driven sprocket 36 that rotates together with the camshaft 25 is fixed to one end of the camshaft 25 and is placed in the cam chain room 35. A cam chain 37 is wound around the driven sprocket 36 and the camshaft drive sprocket 17, so that the camshaft 25 is turned at half the rotational speed of the crankshaft 2 through the cam chain 37 and the driven sprocket 36.

At the other end of the crankshaft 2 is arranged a generator 18 or the dynamo.

In the crankcase 3 are arranged a main shaft 41, a counter shaft 42, and an output shaft 43, which are parallel to the crankshaft 2. The crankshaft 2 and the shafts 41, 42, and 43 constitute the gear transmission mechanism that transmits the rotation of the crankshaft 2 sequentially to the main shaft 41, the counter shaft 42, and the output shaft 43.

As shown in FIG. 2, the crankshaft 2 is arranged at a mating surface 3S between the upper crankcase 3U and the lower crankcase 3L. Behind the crankshaft 2 is arranged the main shaft 41, and behind the main shaft 41 is arranged the counter shaft 42. The main shaft 41 and the counter shaft 42 are arranged at the mating surface 3S. The output shaft 43 is arranged under and in front of the counter shaft 42. In other words, the axis center O1 of the main shaft 41 and the axis center O2 of the counter shaft 42 are positioned in front and behind at the mating surface 3S, and the axis center O3 of the output shaft 43 is positioned behind the axis center O1 of the main shaft 41 and in front and under the axis center O2 of the counter shaft 42.

FIG. 3 is a sectional view taken along the straight line that passes through the crankshaft 2, the main shaft 41, the counter shaft 42, and the output shaft 43.

To the end (close to the cam chain room 35) of the crankshaft 2 is fixed a drive gear 2B (on the crankshaft 2) that rotates the main shaft 41. The drive gear 2B meshes with a driven gear 41A of the main shaft 41. The main shaft 41 is supported by bearings 41C arranged at both ends thereof.

The driven gear 41A is arranged on the main shaft 41 in such a way that it rotates freely relative to the main shaft 41. The driven gear 41A is connected to a clutch mechanism 44, so that the transmission of power from the crankshaft 2 to the main shaft 41 is turned on and off by the action of the clutch mechanism 44.

To the driven gear 41A on the main shaft 41 is attached an oil pump drive gear 41B that drives the oil pump 50 (See FIG. 2). The oil pump drive gear 41B rotates together with the driven gear 41A on the main shaft 41 irrespective of whether the clutch mechanism 44 is on or off. As shown in FIG. 2, the rotational motion of the crankshaft 2 is transmitted through the drive chain (not shown) to the driven gear (not shown) fixed to the drive shaft 50A of the oil pump 50.

As shown in FIG. 3, the counter shaft 42 is supported by the bearings 42C placed at both ends thereof. Between the counter shaft 42 and the main shaft 41 is arranged a group of change gears connecting them which constitute the transmission 46. To be more specific, the main shaft 41 is provided with drive gears m1 to m6 for the first to sixth speeds. The counter shaft 42 is provided with driven gears n1 to n6 for the first to sixth speeds. The drive gears mesh with the driven gears respectively so that they constitute the change gear pairs. In addition, each change gear pair decreases in reduction ratio (for high speed) in going from the first speed to the sixth speed. The gear pair (m1 and n1) with the maximum gear ratio for the first speed is arranged at one end of the main shaft 41 at which the driven gear 41A of the main shaft 41 is supported. The gear pair (m2 and n2) for the second speed is arranged at the other end of the main shaft 41. Between the gear pair (m1 and n1) for the first speed and the gear pair (m2 and n2) for the second speed are sequentially arranged (from one end) the gear pair (m5 and n5) for the fifth speed, the gear pair (m4 and n4) for the fourth speed, the gear pair (m3 and n3) for the third speed, and the gear pair (m6 and n6) for the sixth speed.

The drive gear m3 (for the third speed) and the drive gear m4 (for the fourth speed) on the main shaft 41 are integrally joined to the main shaft 41 by splines. The drive gears are constructed such that they move as the shifter in the axial direction to selectively engage with or disengage from its adjacent drive gears m5 or m6 for the fifth or sixth speed. The driven gear n5 (for the fifth speed) and the driven gear n6 (for the sixth speed) on the counter shaft 42 are joined to the counter shaft 42 by splines. They are constructed such that they move as the shifter in the axial direction to selectively engage with or disengage from its adjacent driven gears n4 or n3 for the fourth or third speed.

The drive gear m3 for the third speed and the drive gear m4 for the fourth speed on the main shaft 41 and the driven gear n5 for the fifth speed and the driven gear n6 for the sixth speed on the counter shaft 42 are moved by a speed change mechanism 47 (see FIG. 2), so that they function as the shifter to accomplish the speed change.

As shown in FIG. 2, the speed change mechanism 47 has a shift drum 47A which is parallel to the shafts 41 to 43. The shift drum 47A is connected to a shift spindle 47E (or shift shaft) (see FIG. 3) through a ratchet mechanism 47D (see FIG. 3) which controls the amount of rotation of the shift drum 47A. The end (leftward end of the vehicle body) of the shift spindle 47E is connected to the change pedal (not shown) to be operated for speed change by the rider. The rotation for speed change of the change pedal rotates the shift drum 47A through the ratchet mechanism 47D.

The shift drum 47A is arranged between and above the main shaft 41 and the counter shaft 42 such that its axis center O4 is behind the axis center O3 of the output shaft 43. In the front and rear of the shift drum 47A are arranged fork axes 47B and 47C parallel thereto. The fork axis 47B is arranged in the front of the shift drum 47A such that its axis center O5 is slightly lower than the axis center O4 of the shift drum 47A. The fork axis 47C is arranged behind the shift drum 47A such that its axis center O6 is approximately at the same height as the axis center O4 of the shift drum 47A.

The fork axis 47B supports a shift fork 47B1 that engages with the shifter of the main shaft 41, and the fork axis 47C supports a shift fork 47C1 that engages with the shifter of the counter shaft 42. The speed change gear pairs are switched by movement of the shift forks 47B1 and 47C1 of the speed change mechanism 47, and the rotation of the main shaft 41 is transmitted to the counter shaft 42 through the speed change gear pairs which have been switched as mentioned above. As shown in FIG. 3, the counter shaft 42 has the intermediate drive gear 42A that transmits the rotation of the counter shaft 42 to the output shaft 43.

The output shaft 43 is supported by bearings 43C attached to both ends of the counter shaft 42. The output shaft 3 has a driven gear 43A that engages with the intermediate drive gear 42A. The output shaft 43 has a torque damper 51 of cam type adjacent to the driven gear 43A. The torque damper 51 of cam type is intended to relieve torque fluctuation. The torque damper 51 has a cylindrical member 52 spline jointed to the output shaft 43 so that it moves in the axial direction. The cylindrical member 52 has, at its end facing the driven gear 43A, a projecting cam 52A that engages with a depressed cam 43B formed in the driven gear 43A. The output shaft 43 has a spring receiving member 53 at its approximately central part, and between the cylindrical member 52 and the spring receiving member 53 is a coil spring 54 that energizes the cylindrical member 52 toward the driven gear 43A. The torque damper 51 of cam type includes the cylindrical member 52, the spring receiving member 53, and the coil spring 54.

To the left end of the output shaft 43 is integrally formed a drive bevel gear 48, which engages with a driven bevel gear 49A that is integrally formed at the fore end of a drive shaft 49 extending toward the rear of the body. In this way the rotation of the output shaft 43 is transmitted to the drive shaft 49.

The following is a description of the inside layout of the internal combustion engine 1 shown in FIG. 2.

The internal combustion engine 1 has the main shaft 41 behind the crankshaft 2 and the counter shaft 42 behind the main shaft 41. Therefore, the crankshaft 2, the main shaft 41, and the counter shaft 42 are arranged in front and behind in this order. This arrangement limits the length of the crankcase 3 in the vertical direction. Moreover, this arrangement offers the advantage that the driven gear 41A fixed to the main shaft does not project upward so much, even though it has a large diameter, as compared with the case in which the main shaft is arranged above the crankshaft and the counter shaft. Thus, this arrangement prevents the crankcase 3 from bulging upward and provides a space between the rear bank Br and a top 3*b* of the crankcase 3 so that auxiliary machines are arranged therein.

In addition, the main shaft 41 and the counter shaft 42 are arranged at the same height as the mating surface 3S of the upper and lower crankcases 3U and 3L. This arrangement simplifies the structure of the bearings 41C and 42C of the main shaft 41 and the counter shaft 42 and facilitates the assembling of the main shaft 41 and the counter shaft 42.

The fact that the output shaft 43 is placed in front of the counter shaft 42 makes the crankcase 3 shorter in the forward and backward direction as compared with the case in which the output shaft 43 is placed behind the counter shaft 42. The output shaft 43 is placed under the counter shaft 42, so that the main shaft 41, the counter shaft 42, and the output shaft 43 lie at the apexes of a triangle. This arrangement permits effective use of the space between the main shaft 41 and the counter shaft 42 and hence prevents the crankcase 3 from bulging downward unlike the case in which the output shaft 43 is placed in front of the counter shaft 42. The result is that the crankcase 3 can be made shorter in the forward and backward direction as well as in the vertical direction. This leads to size and weight reduction of the internal combustion engine 1.

With the crankcase 3 reduced in length in the forward and backward direction, the motorcycle 100 (shown in FIG. 1) has a short wheel base and a compact size, which leads to good maneuverability.

The shift drum 47A is arranged between and above the main shaft 41 and the counter shaft 42. This arrangement renders the crankcase 3 shorter in the forward and backward direction than in the case where the shift drum 47A is arranged behind the counter shaft 42. So, the shift drum 47A, the main shaft 41, and the counter shaft 42 lie at the apexes of a triangle. This geometry permits effective use of the space between the main shaft 41 and the counter shaft 42 and hence prevents the crankcase 3 from bulging upward unlike the case in which the shift drum 47A is placed above the main shaft 41 and the counter shaft 42, thereby limiting the crankcase 3 in length in the vertical direction. This permits the arrangement of auxiliary machines between the rear bank Br and the top 3b of the crankcase 3. Moreover, this arrangement reduce the distance from the shift drum 47A to the main shaft 41 and the counter shaft 42 and hence shortens the shift forks 47B1 and 47C1 supported on the fork shafts 47B and 47C. This leads to a size and weight reduction of the internal combustion engine 1.

The shift drum 47A is arranged such that its axis center O4 is behind the axis center O3 of the output shaft 43. This arrangement renders the crankcase 3 shorter in length in the vertical direction than in the case where the axis center of the shift drum is just above the axis center of the output shaft. This permits the arrangement of auxiliary machines between the rear bank Br and the top 3b of the crankcase 3.

In addition, the fork shaft 47B, the main shaft 41, and the shift drum 47A lie at the apexes of a triangle. This geometry permits effective use of the space between the main shaft 41 and the shift drum 47A and hence prevents the crankcase 3 from bulging upward unlike the case in which the fork shaft 47B is arranged above the main shaft 41. The result is that the crankcase 3 can be made shorter in length in the vertical direction. This permits the arrangement of auxiliary machines between the rear bank Br and the top 3b of the crankcase 3. Also, it is possible to reduce the distance from the fork shaft 47B to the main shaft 41 and the shift drum 47A and hence to shorten the shift fork 47B1 supported on the fork shaft 47B. This leads to a size and weight reduction of the internal combustion engine 1.

Likewise, the fork shaft 47C, the counter shaft 42, and the shift drum 47A lie at the apexes of a triangle. This geometry permits effective use of the space between the counter shaft 42 and the shift drum 47A and hence prevents the crankcase 3 from bulging upward unlike the case in which the fork shaft 47C is arranged above the counter shaft 42. The result is that the crankcase 3 can be made shorter in length in the vertical direction. This permits the arrangement of auxiliary machines between the rear bank Br and the top 3b of the crankcase 3. Also, it is possible to reduce the distance from the fork shaft 47C to the counter shaft 42 and the shift drum 47A and hence to shorten the shift fork 47C1 supported on the fork shaft 47C. This leads to a size and weight reduction of the internal combustion engine 1.

In addition, the motorcycle 100 mentioned above is equipped with a clutch hydraulic mechanism 61 that hydraulically activates the clutch mechanism 44. The clutch hydraulic mechanism 61 includes a push rod 62, a hydraulic cylinder 63, and the hydraulic oil supply source (not shown). The push rod 62 passes through the cylindrical hollow part in the main shaft 41 such that it freely moves in the axial direction. The hydraulic cylinder 63 applies pressure on the push rod 62. The hydraulic oil supply source supplies hydraulic oil (for clutch operation) to the hydraulic cylinder 63. The hydraulic oil is supplied from the master cylinder or electric actuator. The master cylinder includes a cylinder and a piston fitted thereinto. It is mounted near the clutch lever so that it generates hydraulic pressure as the rider manually operates the clutch lever. The electric actuator is provided with an electric motor which generates hydraulic pressure as the rider manually operates the clutch lever or in response to instructions from the ECU (electronic control unit).

Figure 4:
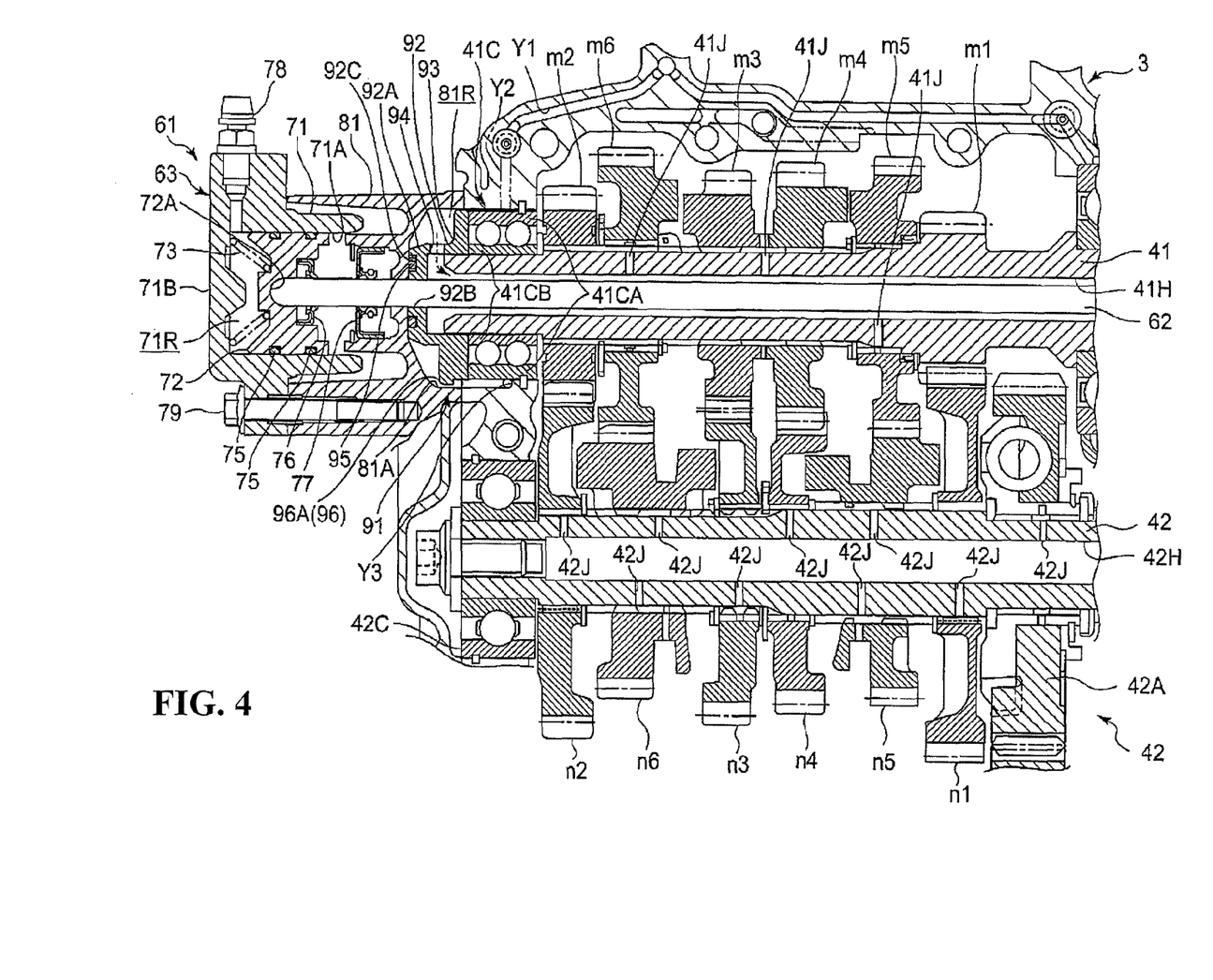
FIG. 4 is a diagram showing the hydraulic cylinder together with its peripheral structures.

FIG. 4 is a diagram showing the hydraulic cylinder 63 together with its peripheral structure.

As shown in FIG. 4, the hydraulic cylinder 63 includes a cylinder proper 71 (of a closed-end cylindrical form), a piston 72, and a spring 73. The piston 72 is movably inserted into a cylinder hole 71A formed in the cylinder proper 71. The spring 73 is arranged between the piston 72 and a bottom 71B of the cylinder proper 71, so that it pushes the piston 72 toward the push rod 62. This hydraulic cylinder 63 is connected to the crankcase 3 through a coupling case 81 (at the left side of the body or the opposite side of the clutch mechanism 44 attached to the main shaft 41) in such a way that the cylinder axis aligns with the main shaft 41 thereby being connected integrally to the internal combustion engine 1.

In FIG. 4, an oil chamber 71R is provided in the cylinder proper 71. The oil chamber 71R is supplied with a clutch operating oil (under pressure) from the oil supply source. The piston 72 has a rod inserting hole 72A into which one end of the push rod 62 is inserted. As the piston 72 moves toward the main shaft 41, the push rod 62 moves toward the clutch mechanism 44 along a through-hole 4111 in the main shaft 41. In addition, the spring 73 is intended to make the push rod 62 free of play when the pressurized clutch operating oil is not supplied.

Also, in FIG. 4, O-rings 75 and 75 (mounted on the piston 72) seal the gap between the piston 72 and the cylinder hole 71A. Oil seals 76 and 77 are placed between the push rod 62 and the piston 72 and between the push rod 62 and the coupling case 81. An air vent plug 78 is provided to vent air from the oil in the cylinder proper 71. A connecting bolt 79 is provided to fasten the cylinder proper 71 to the coupling case 81.

The hydraulic cylinder 63 is constructed such that when the oil chamber 71R in the cylinder proper 71 is not supplied with the pressurized clutch operating oil, the push rod 62 is pushed toward the hydraulic cylinder 63 by the energizing spring force (to keep the clutch connected) of the clutch mechanism 44 itself through the lifter piece (not shown) of the clutch mechanism 44. As the result, the push rod 62 is held close to the hydraulic cylinder 63 and the clutch mechanism 44 is kept in the connected state.

On the other hand, when the oil chamber 71R is supplied with the pressurized clutch operating oil, the piston 72 moves toward the clutch mechanism 44 against the spring's energizing force of the clutch mechanism 44 and hence the push rod 62 moves toward the clutch mechanism 44, thereby moving the lifter piece of the clutch mechanism 44 and switching the clutch mechanism 44 into the non-connected state. In this way, the clutch mechanism 44 is disconnected.

The coupling case 81 that joins together the hydraulic cylinder 63 and the crankcase 3 has a space 81R (or a recess to accommodate the bearing) that separates the coupling case 81 from the main shaft 41 and the bearing 41C.

This space 81R is formed by depressing the coupling case 81 in such a way that it is outside (left) of the bearing 41C at the end of the main shaft 41. The space extends in the axial direction of the main shaft 41 and flares out in the radial direction of the main shaft 41 until its end has almost the same diameter as the outside diameter of the bearing 41C. Consequently, the coupling case 81 is not in contact with the bearing 41C and the periphery of the bearing 41C is in contact with the crankcase 3.

The space 81R communicates with the oil pump 50 through oil passages (indicated by Y1, Y2, and Y3 in FIG. 4). The oil pump 50 serves as the lubricating oil supply source to feed lubricating oil to various parts of the internal combustion engine 1. Thus, the space 81R is supplied with lubricating oil from the oil pump 50 while the engine is working.

The oil passage Y3 is a groove extending, along the outer periphery of the bearing 41C, from the end (close to the coupling case 81) of the crankcase 3. It communicates with a groove 81A mentioned later (see FIG. 4), which is formed in the coupling case 81, so that lubricating oil is supplied from the oil passage Y3 to the space 81R.

As shown in FIG. 4, the space 81R, which is between the coupling case 81 and the bearing 41C, has an oil guide part 91 that guides lubricating oil to both the through-hole 41H and the berating 41C of the main shaft 41 through the space 81R.

The main shaft 41 has multiple oil passages 41J, which range at certain intervals in the axial direction and extend in the radial direction from the through-hole 41H, for lubrication of the speed change gears. When the through-hole 41H of the main shaft 41 is supplied with lubricating oil through the oil guide part 91, the lubricating oil is subsequently supplied through the oil passages 41J to the inner periphery of the drive gears m1 to m6 arranged on the main shaft 41. In this way the transmission 46 is lubricated.

In addition, as shown in FIGS. 3 and 4, the counter shaft 42 also has a through-hole 42H, which runs in the axial direction, for supply of lubricating oil from the oil pump 50. The counter shaft 42 has multiple oil passages 42J, which range at certain intervals in the axial direction and extend in the radial direction from the through-hole 42H, for lubrication of the speed change gears. When the through-hole 4211 of the counter shaft 42 is supplied with lubricating oil, the lubricating oil is subsequently supplied through the oil passages 42J to the inner periphery of the driven gears n1 to n6 arranged on the counter shaft 42.

The following description is directed to the oil guide part 91.

Figure 5A:
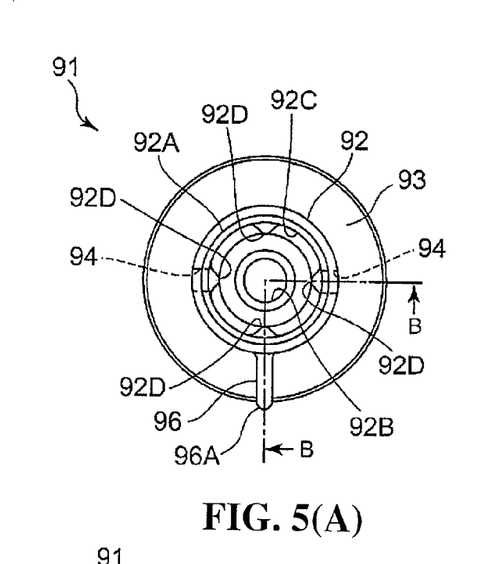
FIG. 5(A) is a plan view showing the oil guide part.
Figure 5B:
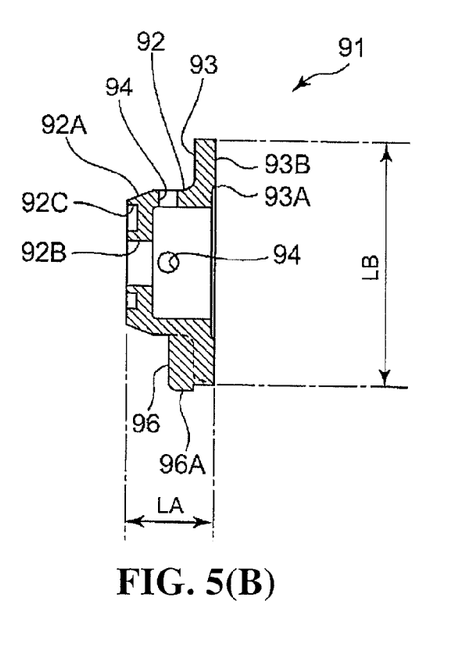
FIG. 5(B) is a sectional view taken along the line B-B in FIG. 5(A)
Figure 5C:
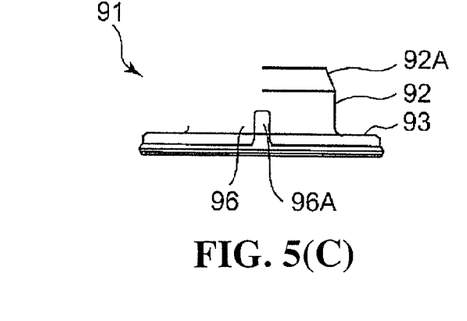
FIG. 5(C) is a side view.

FIG. 5(A) is a plan view showing the oil guide part 91. FIG. 5(B) is a sectional view taken along the line B-B in FIG. 5(A). FIG. 5(C) is a side view.

The oil guide part 91 is a single part which is integrally composed of a bottomed cylinder 92 with one end opened and a flange 93 flaring outward from the edge of the opening of the bottomed cylinder 92. The bottomed cylinder 92 has oil holes 94 for communication between the inside and the outside of the bottomed cylinder 92.

As shown in FIG. 4, the oil guide part 91 is arranged in the space 81R in such a way that a disc 92A (at the other end of the bottomed cylinder 92) faces the coupling case 81 and the flange 93 faces the bearing 41C, and it is formed in such a way that the push rod 62 penetrates it.

To be more specific, the length LA (from the disc 92A to the flange 93) is approximately equal to (or exactly equal to or slightly shorter than) the length in the direction of the main shaft 41 in the space 81R. The outside diameter LB of the flange 93 is approximately equal to (or exactly equal to or slightly smaller than) the maximum inside diameter of the space 81R.

The disc 92A of the bottomed cylinder 92 has a through-hole 92B which the push rod 62 penetrates, and it also has a circular recess 92C (into which an O-ring 95 fits) on its side facing the coupling case 81. The circular recess 92C has multiple narrowing parts 92D arranged at certain intervals in the circumferential direction. (In this embodiment, there are four narrowing parts 92D 90° apart. See FIG. 5(A).) These narrowing parts 92D hold the O-ring 95, facilitate the fitting of the O-ring 95, and prevent the O-ring 95 from slipping off from the oil guide part 91.

The O-ring 95 fitted into the circular recess 92C projects outward from the surface of the disc 92A (toward the coupling case 81), so that it comes into contact with the coupling case 81 when the oil guide part 91 is arranged in the space 81R. Thus, the O-ring undergoes elastic deformation and the restoring force of elastic deformation energizes the oil guide part 91 toward the opposite side of the coupling case 81 and pushes the flange 93 against the bearing 41C. In other words, the O-ring functions as an energizing member that presses the oil guide part 91 against the bearing 41C, and it surely presses the oil guide part 91 against the bearing 41C even though the oil guide part 91 has small dimensional errors or the space 81R in the coupling case 81 has small dimensional errors.

In addition, the O-ring 95 does not need to function as an oil seal because the oil seal 77 is provided between the push rod 62 and the oil guide part 91.

The flange 93 is in contact with an outer race 41CA of the bearing 41C (which is a roller bearing) but is not in contact with an inner race 41CB of the bearing 41C. In other words, the flange 93 has a step 93A which is depressed inward so that it does not come into contact with the inner race 41CB of the bearing 41C, and an outer peripheral part 93B outside the step 93A comes into contact with the outer race 41CA of the bearing 41C. Therefore, a gap occurs between the step 93A and the inner race 41CB of the bearing 41C. This gap functions as an oil passage to supply lubricating oil to the bearing 41C.

Since the flange 93 does not come into contact with the inner race 41CB of the bearing 41C which rotates together with the main shaft 41 while the internal combustion engine 1 is running, the rotational force is not transmitted to the flange 93 and this prevents the oil guide part 91 from rotating and hence prevents the occurrence of rotational friction.

The oil guide part 91 has a flat wall 96, as a detent formed integrally therewith, which extends straight outward in the radial direction from the bottomed cylinder 92. The wall 96 slightly projects outward beyond the flange 93, and a projecting part 96A fits into the groove 81A formed in the coupling case 81. (See FIG. 4.)

In other words, the groove 81A of the coupling case 81 engages with the wall (as a detent) of the oil guide part 91, and this locking structure prevents the oil guide part 91 from rotation and determines its position with respect to the coupling case 81. The wall 96 is formed integrally with the flange 93 in such a way that it extends in the radial direction of the flange 93 from the bottomed cylinder 92. It also functions as a rib to increase the rigidity of the flange 93 as well as the oil guide part 91 as a whole.

The bottomed cylinder 92 of the oil guide part 91 has the oil holes 94 formed at certain intervals in the circumferential direction. The oil holes 94 are through-holes that penetrate in the radial direction between the disc 92A and the flange 93. Therefore, the lubricating oil that has been introduced into the space 81R enters the bottomed cylinder 92 through the oil holes 94 of the oil guide part 91, as indicated by the broken line arrow in FIG. 4. A portion of the lubricating oil is supplied to the bearing 41C through the gap between the flange 93 and the inner race of the bearing 41C, and the remainder of the lubricating oil enters the oil passages 41J extending in the radial direction from the through-hole 41H through the through-hole 41H of the main shaft 41 (to be specific, through the gap between the through-hole 4111 and the push rod 62), thereby lubricating the drive gears m1 to m6.

As mentioned above, the lubricating oil is supplied to the through-hole 41H of the main shaft 41 through the small oil holes 94 formed in the oil guide part 91. This offers the advantage that less lubricating oil flows into the bearing 41C and the drive gears m1 to m6 than in the case where the oil guide part 91 is not added. Moreover, the amount of lubricating oil to be supplied can be controlled easily and accurately by adjusting the diameter and number of the oil holes 94. The foregoing configuration with two oil holes 94 arranged 180° apart adequately controls the amount of lubricating oil passing through the oil guide part 91.

According to the embodiment mentioned above, the transmission has the space 81R (as a recess to hold the shaft therein) in which is arranged the oil guide part 91. The oil guide part 91 has the bottomed cylinder 92, with its one end opened, the flange 93 that flares outward at the open end of the bottomed cylinder 92, and the oil holes 94 that communicate between the inside and the outside of the bottomed cylinder 92. The oil guide part 91 is arranged in the space 81R in such a way that the flange 93 comes into contact with the outer race 41CA of the bearing 41C. The arrangement in this way permits an adequate amount of lubricating oil to be supplied to those parts (such as bearing 41C and transmission gears) around the main shaft (transmission shaft) 41 while preventing a large amount of lubricating oil from being supplied to the oil passages in the main shaft 41. Moreover, the oil guide part 91 can be easily assembled because it is simply inserted between the coupling case 81 and the bearing 41C.

In addition, the bottomed cylinder 92 of the oil guide part 91 is arranged such that the end opposite to the flange 93 comes into contact with the coupling case 81 and the surface of the end has the circular recess 92C into which the O-ring 95 is fitted. Despite its simple structure, this O-ring absorbs the dimensional errors of the parts and permits the oil guide part 91 to be mounted adequately.

Also, the circular recess 92C has the multiple narrowing parts 92D to secure the O-ring 95. This structure prevents the O-ring 95 from slipping off and facilitates assembling.

The oil guide part 91 has the flat wall 96 as a detent on its periphery, which fits into the groove 81A (communicating with the lubricating oil supply source) formed in the coupling case 81. This structure facilitates the positioning and assembling of the oil guide part 91. The groove 81A serves as both the detent for the oil guide part 91 and the passage for lubricating oil. This arrangement saves fabricating steps and simplifies configurations.

Moreover, as shown in FIG. 4, the above-mentioned structure is characterized in that the end of the main shaft 41 as the transmission shaft projects from the bearing 41C toward the coupling case 81 and fits into the bottomed cylinder 92 of the oil guide part 91. An adequate clearance between the projecting part of the shaft end and the inside diameter of the oil guide part 91 ensures the supply of lubricating oil to the bearing. Also, the outer periphery of the flange 93 of the oil guide part 91 is faucet-fitted into the coupling case 81, so that an adequate clearance is ensured between the extended part of the shaft end and the inner periphery of the oil guide part 91.

The description of the foregoing embodiment is about the motorcycle 100 of manual transmission type (MT for short) which needs hand control for speed change.

Among motorcycles attracting attention recently are those of automated manual transmission type (AMT for short) which is similar in structure to MT but is equipped with the clutch and transmission which are operated by a computer-controlled motor or a hydraulic system. It is expected that motorcycles of the same model will be of either MT type or AMT type according to customers' preference. However, motorcycles of AMT type need additional mechanism for automatic operation of the clutch and transmission, which increases the number of parts and requires more space for them.

In the case of motorcycle 100 of MT type mentioned above, the oil guide part 91 is arranged in the space 81R as a recess to accommodate the shaft. By contrast, in the case of a motorcycle of AMT type, the oil guide part 91 is omitted and the space 81R is used for any other parts for AMT. For example the space 81R may be used to arrange therein nuts and spacers.

In this case, those nuts etc. arranged in the space 81R somewhat suppress the amount of lubricating oil to be supplied to the bearing 41C and the through-hole 41H in the main shaft 41. Therefore, the motorcycle may be equipped with the coupling case 81 and the hydraulic cylinder 63 in common regardless of whether it is of MT type or AMT type. This decreases the number of parts and reduces the production cost.

The above-mentioned embodiment is merely an example of the present invention, and it may be modified and changed within the scope of the present invention. The foregoing is based on the assumption that the present invention will be applied to motorcycles shown in FIG. 1. However, the present invention may also be applied to saddled vehicles of any type including motorcycles, mopeds, tricycles, and four-wheel cars as ATV (all terrain vehicles).

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A lubricating oil feeding structure for feeding lubricating oil from a lubricating oil supply source to a lubricating oil passage of a transmission shaft and to a bearing supporting a shaft end of a transmission shaft, the lubricating oil being fed through a space formed in a casing arranged outside the bearing, and the lubricating oil feeding structure being arranged so as to face the bearing and the lubricating oil passage extending in the transmission shaft from the shaft end of said transmission shaft, the lubricating oil feeding structure comprising:

an oil guide part positioned within a space for accommodating the transmission shaft, wherein the oil guide part includes:

a bottomed cylinder, with one end thereof having an opening, a flange that flares outwardly from the opening of the bottomed cylinder, and oil holes adapted for communicating the oil between an inside and an outside of said bottomed cylinder, the oil guide part being arranged in the space for accommodating the transmission shaft, so that the flange of the oil guide part comes into contact with an outer race of said bearing, wherein the flange of the oil guide part includes:

a single flat wall, acting as a detent, and extending in a radial direction of the flange, wherein the single flat wall includes a projecting part projecting from a circumferential edge of the flange, and fitting into a groove formed in said casing.

2. The lubricating oil feeding structure according to claim 1, wherein said bottomed cylinder of said oil guide part is disposed wherein the end surface opposite to said flange comes into contact with said casing and said end surface has a circular recess formed therein, said circular recess holding an O-ring fitted thereinto.

3. The lubricating oil feeding structure according to claim 2, wherein said circular recess has multiple narrowing parts formed therein to retain said O-ring.

4. The lubricating oil feeding structure according to claim 2, wherein said shaft end of said transmission shaft extends into said bottomed cylinder of said oil guide part.

5. The lubricating oil feeding structure according to claim 1, wherein said shaft end of said transmission shaft extends into said bottomed cylinder of said oil guide part.

6. The lubricating oil feeding structure according to claim 1, wherein the flange includes:
   a flat surface facing outer and inner races of the bearing,
   an outer peripheral part of the flat surface of the flange which comes in contact with the outer race of the bearing,
   a step formed in a central portion of the flat surface of said flange facing the bearing, said step being adapted for communicating the oil from said oil holes to said step for lubricating the bearing.

7. The lubricating oil feeding structure according to claim 6, wherein, in relation to the outer peripheral part of the flat surface of the flange,
   the step is depressed inwardly on the flat surface of the flange, so that the step does not come into contact with an inner race of the bearing.

8. A oil guide part adapted for feeding lubricating oil from a lubricating oil supply source to a lubricating oil passage of a transmission shaft and a bearing supporting a shaft end of a transmission shaft,
   the lubricating oil being fed through a bearing accommodating recess part which is formed in a coupling casing,
   the oil guide part comprising:
   a bottomed cylinder having a first end and a second end;
   an opened end formed at said first end of the bottom cylinder;
   a flange flaring outwardly from the opened end of said bottomed cylinder;
   oil holes adapted for communicating the oil between an inside and an outside of said bottomed cylinder; and
   a step formed in a flat surface of said flange facing the bearing, said step being adapted for communicating the oil from said oil holes to said step for lubricating the bearing,
   wherein the flange includes a flat wall with a single detent which projects from a circumferential edge of the flange, and the detent being adapted to fit into a groove which is formed in the coupling casing.

9. The oil guide part according to claim 8, wherein said second end of said bottomed cylinder includes a circular recess formed therein, said circular recess holding an O-ring fitted thereinto.

10. The oil guide part according to claim 9, wherein said circular recess has multiple narrowing parts farmed therein to retain said O-ring.

11. The oil guide part according to claim 10, and further including a through-hole formed in the second end of the bottomed cylinder.

12. The oil guide part according to claim 9, and further including a through-hole formed in the second end of the bottomed cylinder.

13. The oil guide part according to claim 8, and further including a through-hole formed in the second end of the bottomed cylinder.

14. The oil guide part according to claim 8, wherein, in relation to the outer peripheral part of the flat surface of the flange,
   the step is depressed inwardly on the flat surface of the flange facing the bearing, so that the step does not come into contact with an inner race of the bearing.

* * * * *